United States Patent Office 3,843,431
Patented Oct. 22, 1974

3,843,431
PROCESS FOR MAKING FIBROUS
COMPOSITION BOARD
William W. Dostalik, Miami, Okla., assignor to
Nancy L. Dostalik, Miami, Okla.
No Drawing. Filed June 23, 1972, Ser. No. 265,621
Int. Cl. B32b 5/28, 27/42
U.S. Cl. 156—62.2
2 Claims

ABSTRACT OF THE DISCLOSURE

A new wood composition board similar to fiberboard and hardboard and produced by a process broadly similar to the method of making particleboard. The resulting composition board has excellent edge properties in appearance, machineability, paintability, etc. The process involves starting with residues from furniture plants, sawmills, millwork plants and the like. The raw materials have been suitably "hogged" (ground up) to facilitate conveying by pneumatic or mechanical means. These raw materials include all species of softwoods and hardwoods, both green and dry, and will also include scraps and residues that might otherwise be discarded or burned. In this regard the present invention is ecology-orientated. The raw materials are wetted in water until they contain approximately thirty percent moisture (oven dry basis). The wood is then reduced to a mixture of fibers and fines by the use of a double disc attrition mill. After grinding, the mixture of fibers and particles is dried to reduce the moisture content to approximately five percent (O.D. basis). Following the drying, the ground material is classified (separated) into surface fines and core fibers using twenty mesh screens. Thereafter adhesive is added separately to the fibers and to the fines. The fines-adhesive mixture is formed into mats and the fiber-adhesive mixture is also formed separately into mats. In accordance with a preferred embodiment of the invention, a fine-adhesive mat is placed over a wire screen. Thereafter a fiber-adhesive mat is superimposed on the fine-adhesive mat. Finally, another mat of the fine-adhesive mixture is superimposed upon the fiber-adhesive mat to produce a resulting sandwich configuration. The resulting sandwich configuration is placed in a press with another screen superimposed over the mat. The sandwich is pressed to the desired thickness at about 430° F. for a period of one to six minutes, depending upon the thickness of the mats employed, into desired thickness of the resulting composition board. After removing the pressed board from the press and cooling, the resulting board is trimmed and tested.

BACKGROUND OF THE INVENTION

(1) Field of the Invention

The present invention relates to a composition board and method of making the same. More particularly, the present invention employs materials which are normally used (except when discarded) in the making of particleboard, but the composition board produced is vastly superior to conventional particleboard and the method employed in making the composition board contains novel steps that are not involved in the conventional particleboard process but is simpler.

(2) Description of the Prior Art

The art generally teaches that the materials which are employed as raw materials in the present invention would be used in the making of particleboard. However, particleboard has extremely poor edge properties with respect to appearance, machineability, paintability and the like. These poor edges often necessitate the use of edge filling or lumber or plastic banding operations which often cost more than the initial cost of the board.

Certain medium density fiberboards have been able to overcome these edge difficulties, but this is expensive and involves pressurized digesting and grinding and the use of very low bulk density fiber and R-F heating at the press. The present invention has similar edge qualities but has better faces and is much easier and less costly to produce.

SUMMARY OF THE INVENTION

The raw material which is used in the present invention is in the form of residues from furniture plants, sawmills, millwork plants and the like, which materials, where possible, are used in the making of particleboard and which are sometimes otherwise discarded or burned. These raw materials can include all species of softwoods and hardwoods, both green and dry. One of the important features of the present invention involves moisturizing raw material so that its moisture content is between twenty and forty percent (oven dry basis). As used in this application, the term "oven dry basis" means the percentage of any ingredient as related to the dry weight of the wood, regardless of the inclusion of other solid or liquid materials in the mixture.

After the raw material has been suitably moisturized, it is ground in an attrition mill to produce a mixture of fibers and fines which are thereafter dried to a moisture content of about five percent (O.D. basis). Following the drying, the wood mixture is classified, using a twenty mesh screen, into fibers and fines. The fines, of course, will be smaller than twenty mesh and the fibers will be lengths mostly shorter than three-eighths of an inch and widths and thicknesses considerably less than their length. The lengths of the fibers will be approximately seven to ten times the widths and thicknesses thereof.

The dry fibers, which have a bulk density of approximately six pounds per cubic foot, are then mixed with a catalyst-adhesive mixture. The amounts are properly proportioned and added to a blender so that the resulting mixture has about eight percent adhesive resin (O.D. basis).

The fines which has a bulk density of about eleven pounds per cubic foot are blended with an adhesive mixture until the resulting mixture has about twelve and one-half percent adhesive (O.D. basis).

Next a layer or mat of fines-adhesive mixture is placed over a wire screen. Next a layer of the fiber-adhesive mixture and then another layer of fines-adhesive mixture to obtain a three-layer sandwich configuration are felted. Another screen section is placed on the resulting sandwich configuration and the latter is placed in a hot press up to 480° F. up to 1000 p.s.i. for a total of about six minutes. After the hot pressing, the resulting board is removed and cooled.

DESCRIPTION OF THE PREFERRED EMBODIMENT

Raw materials

The raw materials are scraps, shavings, sawdust, etc. obtained from furniture plants, sawmills, millwork plants, etc. Although some of this material could be used for the manufacture of particleboard, much of it might be discarded or burned. Thus, the present invention contributes to the ecology in that it utilizes materials that might otherwise be discarded. The raw materials have been "hogged" (ground up) to facilitate conveying by pneumatic or mechanical means. These raw materials include all species of hardwoods and softwoods, green and dry. The present process can use limited amounts of plywood trim (up to forty percent) sanderdust (up to fifteen percent), green sawmill sawdust (up to one hundred percent) and dry sawdust (up to fifty percent).

Water blending

The materials referred to above are blended with water by spraying sufficient quantities of water thereon to raise the mixture content of the wood to about thirty percent (O.D. basis). Higher moisture content is possible but unnecessary.

Holding step

The wetted wood is maintained in a silo or live bottom bin to permit the moisture to penetrate the wood. The amount of time that the wood is maintained in this holding step may depend upon the requirements of the subsequent steps but, at any event, the waiting period should be no less than twenty minutes.

Grinding

After the wood has been held in the holding step for a period of time of at least twenty minutes, the wetted wood is reduced to a usable fiber by passing the same through a double disc attrition mill or similar machine which is well known in the trade. Due to the many variables such as species, particle shape and size prior to grinding, disc diameter, motor speed, etc. it is difficult to ascertain the exact operating conditions for a given plant. The experimental boards which will be described hereinafter were made with an attrition mill of twenty-four inch diameter discs with 1800 r.p.m. motors and plate pattern numbers 24316 and 24302, .045 inch opening and power consumption of 2.5 h.p.-days/ton. Plant trials using a thirty-six inch machine with 1800 r.p.m. motors and plate pattern numbers 36301 and 36302 at .045 inch plate opening yielded similar results.

Drying

After the ground wood material leaves the grinders, it is picked up and conveyed pneumatically to the dryer. The moisture content of the wood material is then reduced to approximately five percent (O.D. basis) in a conventional gas fired rotary dryer as is used in fiberboard and particleboard processes.

Separating

Following the drying of the wood materials, the same is classified (separated) into fines and fibers by rotary or vibrating screens which are well known in the art. The preferred separation has been found to occur using approximately twenty mesh screens, but screens slightly larger or slightly smaller could be used within the spirit of this invention.

Prior to this separation step, the fiber and fines mixture would have a bulk density of about eight pounds per cubic foot. After separation, the fiber portion would have a bulk density of approximately six pounds per cubic foot and the fines would have a bulk density of approximately eleven pounds per cubic foot. The fibers can be generally described as short in length (approximately ninety-five percent less than one-half inch long) and long (seven to ten times) as compared with their width and thickness. These fibers do not resemble flakes or shavings in shape or size as would normally be used in particleboard.

Blending of Fibers

After separating the fiber, it is blended in a conventional particleboard blender with a commercial urea-formaldehyde adhesive. If due to low wood acidity a "catalyst" consisting of ammonium sulfate and ammonium hydroxide is added to the adhesive prior to blending. Small amounts of paraffin wax emulsion up to 2% and other additives such as fire retardants or insect repellants can also be added in the blender. The amount of adhesive solids is about 8% based on the O.D. basis of fiber and the moisture content of the fiber-adhesive mixture is about 8%. The solids adhesive content in the foregoing fiber, adhesive mixture, is approximately eight percent (O.D. basis), the wax percent is 1%.

Blending of fines

The fines are similarly blended in the fiber except no "catalyst" is used and more adhesive is used such as about 12.5% solids of the O.D. weight of the wood. The moisture content of the fines-adhesive mixture is about 12% (O.D. basis).

Forming

After the fiber and fines are blended with the adhesive the next step is mat formation. In this preferred method a wire or screen similar to those used in hardboard and fiberboard instead of cauls, belts, or "caulless" methods as normally in particleboard plants is used to form mats on and conveying into the press.

In the preferred embodiment a fines-adhesive is deposited on the screen and at least one layer of fiber-adhesive mixture is deposited on the first layer of fines-adhesive layer and then another fines-adhesive layer is deposited resulting in a sandwich configuration. As will appear hereafter in the specific examples, the ratio of the weight of the intermediate fiber-adhesive mixture will vary to the weight of the outer fine-adhesive layers.

Pressing

One of the important features of the present invention is the manner in which hot pressing is accomplished. The prevalent theory in the trade is, if the closing time of the press (the time after the mats come into contact with the press platens under pressure until final thickness is achieved) is too fast, that the density of the board will progressively decrease to the center of the board resulting in low internal bond strength, a porous center, tighter faces, and greater strength and stiffness in bending. Conversely, this theory implies that better center line density consolidation and consequent higher internal bond strength and tight edges can be achieved by increasing closing time thus reducing stiffness and bending strength. On the other hand, the present invention involves very rapid closing times which will result in increased production and lower costs. Nevertheless, the product produced by the present invention has a nearly uniform density core between denser faces with a resulting high bond strength and improved edges and tightness for machineability and finishing; at the same time the product of the present invention has an increased stiffness and bending strength.

The sandwich configuration produced by the preceding step is then trimmed to width and length before entering the hot press on the screen. The practice from prepressing 50 to 300 p.s.i. of the mat with fiber board and particleboard is eliminated because it is unnecessary. The closing time will vary between about ten seconds and about thirty seconds depending on density and the total press time will vary from about one minute to six minutes depending upon the thickness of the board. In this preferred method temperature up to 450° F. and pressures of 1000 p.s.i. in order to achieve rapid press times.

Cooling

After pressing, the pressed board is removed from the screens and cooled in any conventional manner.

Sawing

After cooling, the board is trimmed to final size.

Sanding

The trimmed board from the preceding step is sanded on both surfaces to remove the impressions formed by the screens and to provide smooth surfaces on both sides of the board.

Variables

The moisture content of the wood material prior to grinding has been described as about thirty percent, but it could be between twenty and forty percent with similar results achieved (O.D. basis); higher moisture contents are unnecessary. After screening the bulk density of the fiber should be between four and ten pounds per cubic foot (O.D. basis) and preferably in a range of about five to eight pounds per cubic foot. The bulk density of the fines should be in the range of six to twelve pounds per cubic foot and preferably in the upper end of this range.

The adhesive described above is a urea-formaldehyde adhesive. Other similar adhesives can be used such as malamine - formaldehyde, urea - melamine formaldehyde and phenol-formaldehyde, although the latter is generally used only in the outer fines-adhesive layers because of the higher cost and slower reaction time of phenol formaldehyde.

Other additives can be included with the adhesives as indicated above such as paraffin wax, water, and certain "catalysts" which have been described herein as ammonium sulfate and ammonium hydroxide. The amount of adhesive used can vary over a wide range depending upon the species, end use of the board, board density and other factors. For the core of the board, the fiber-adhesive layer, the normal range of adhesive solids is four to twelve percent and preferably six to nine percent (O.D. basis). The surface layers which may contain the fines-adhesive mixture usually contain a greater amount of adhesive in the range of six to fifteen percent and preferably ten to twelve percent (O.D. basis) for adhesives of the urea or melamine types; where the phenol type adhesive is used in the fines-adhesive mixture, the amount of adhesive would range from four to ten percent and preferably seven to eight percent (O.D. basis).

The moisture content of the core fiber after blending is usually in the range of six to eight percent, whereas the surface will usually contain about eight to fifteen percent and preferably about twelve percent (O.D. basis) although can be much higher.

As far as the forming step is concerned, it is possible to use outer layers of fines-adhesive mixture of varying thickness as compared to the central core layer of fiber-adhesive mixture, depending upon the desired properties of the board to be produced; in fact, it is possible to make a board using only the fiber-adhesive mixture.

EXAMPLE NO. 1

I obtained dry "hogged" furniture plant waste consisting mostly of hardwood such as luan, oak, gum, walnut, and others but containing small amounts of softwood, plywood, sanderdust, and particleboard trim, having a bulk density of about twelve pounds per cubic foot and a moisture content of ten percent (O.D. basis). The predominant species appeared to be gum and oak. I placed about one hundred pounds of wood of the above waste material in a blender and sprayed sufficient water to raise the moisture content to about thirty percent (O.D. basis). The wetted wood was then sealed in fiber barrels to prevent moisture loss.

After a brief waiting period of about twenty minutes, I processsed all of the wetted wood through a twenty-four inch double disc attrition mill with grinding plate numbers 24316 and 24302 with an opening between the plates of .045 inches to obtain a short fiber with a bulk density of about eight pound per cubic foot. I then dried the ground wood particles in racks in an oven for about three hours at 200° F. and sixteen hours at 180° F. to reduce the moisture content to about four percent (O.D. basis).

After drying, I passsed the ground wood material, which had a bulk density of about eight pounds per cubic foot, over a twenty mesh vibrating screen and thereby separated the ground wood into a fraction which was larger than twenty mesh and which had a bulk density of six pounds per cubic foot and into a fraction which was smaller than twenty mesh and which had a bulk density of eleven pounds per cubic foot. The fraction which was larger than twenty mesh contained the fibers approximately ninety-five percent of which were less than one-half inch in length and wherein the width and thickness of the fibers was one-tenth to one-seventh of the length. After separating into fibers and fines, these materials were stored separately in plastic bags.

Next, I prepared the "catalyst" mixture for the adhesive to be used in combination with the fibers. To eighty grams of water I added one hundred grams of ammonium sulfate and fifty grams of ammonium hydroxide to constitute the "catalyst" mixture. To one thousand grams of commercial sixty-five percent solids urea-formaldehyde adhesive, I then added one hundred grams of the "catalyst" mixture. Using a small paddle-type blender I took four hundred grams of the fiber (O.D. basis) and added to it five hundred thirty four grams of the catalyst-adhesive mixture previously prepared with a spray gun and then separately added about eighty grams of a fifty percent solids paraffin wax emulsion as a size, after blending the mixture was resealed in a plastic bag.

The adhesive mixture for the fines was prepared merely by taking one thousand grams of commercial sixty five percent solids urea-formaldehyde adhesive and adding thereto eighty-five grams of water as a diluent. Then, to two thousand grams of the minus twenty mesh fines I added four hundred sixteen grams of the diluted adhesive into the blender by means of a spray gun and thereafter separately added forty grams of a fifty percent solids paraffin wax emulsion. The fines-adhesive mixture was then sealed in a plastic bag until ready for use.

At this juncture, the fiber mixture contained approximately eight percent (O.D. basis) adhesive and the fines mixture contained approximately 12.5 percent (O.D. basis) adhesive.

Inside an eighteen inch by eighteen inch deckle box over a wire screen I felted by hand a layer weighing three hundred thirty grams of the fine-adhesive mixture. Then I felted a layer of nineteen hundred forty grams of the fiber-adhesive mixture. Finally, I felted a layer of three hundred thirty grams of the fines adhesive mixture thereby obtaining a three-layered sandwich configuration.

I removed the deckle box from the sandwich configuration and placed another section of screen on the top of the resulting configuration. Then I placed the resulting configuration into a twenty-four inch by twenty-four inch hot press at 430° F. for a total time of three minutes. The initial pressure of the press was 750 p.s.i. but this pressure was gradually reduced to 75 p.s.i. after the preset thickness of 13/16 inches was achieved. The closing time of the press, i.e., the elapsed time between the contacting of the press platen with the mat and the reaching of the preset thickness, in this case was about fifteen seconds which was included in the total time of three minutes referred to above.

After the three minute pressing period, I removed the press board from the screens and after cooling for several minutes, I trimmed the board to a sixteen inch by sixteen inch piece and checked the density and thickness and then stored the board to wait for the testing. The results of all of the tests on this board showed that it was predominately hardwood, that it had a nominal thickness of three-quarters inch, a density of thirty-five pounds per cubic foot, an adhesive content of about 8.9 percent, a modulus of rupture of 1300 p.s.i., an internal bond of 58 p.s.i. and screw holding power of ninety six pounds.

EXAMPLE NO. 2

The second experimental board was produced under the same conditions as set forth in Example No. 1 above, except that the intermediate fiber-adhesive layer contained twenty-five hundred grams. This fiber-adhesive mixture was prepared in exactly the same manner as set forth in Example No. 1 with the same percentage of adhesive solids, etc. The total of pressed time was three minutes and the closing time which was included in this three minute period was about twenty seconds. This board No. 2 has a nominal thickness of three-quarters of an inch, a density of forty-three pounds per cubic foot, the species was predominantly hardwood as in Example No. 1, the adhesive content was about 8.9 percent (O.D. basis), the modulus of rupture was 2400 p.s.i., the internal bond strength was 150 p.s.i. and the screw holding test showed one hundred ninety-two pounds.

EXAMPLE NO. 3

The third experimental board was produced in a manner similar to that set forth in the above examples, except that the board was composed entirely of a fiber-adhesive mixture. I used 3300 grams of a fiber-adhesive mixture which was prepared in substantially the same manner as set forth in Example No. 1. The only difference in the preparation of the fiber-adhesive mixture of this example was that a slightly greater amount of the "catalyst" adhesive mixture was employed such that the adhesive solids represented eight and one-half percent (O.D. basis) of the mixture. The total pressed time was three minutes and the closing time, which was included in this three minutes time, was approximately thirty seconds. This board was tested and showed a nominal thickness of three-quarters of an inch, a density of forty-seven pounds per cubic foot, the species was predominantly hardwood, the adhesive content was 8.5 percent (O.D. basis), the modulus of rupture was 3300 pounds, the internal bond was 150 p.s.i., the screw holding test showed 277 pounds and the board appeared to be homogeneous.

EXAMPLE NO. 4

In this example, the starting material was ponderosa pine as opposed to the mixture of materials employed in Example No. 1. However, the ponderosa pine was wetted, ground, dried and separated in exactly the same manner as set forth in Example No. 1. The fiber-adhesive mixture and the fines-adhesive mixture from this ponderosa pine was prepared in exactly the same way as Example No. 1. The outer layers of the board were prepared from 330 grams of the fines-adhesive mixture as in the case of Example No. 1 and the intermediate core fiber layer was prepared from 2600 grams of a fiber-adhesive mixture of the ponderosa pine prepared in exactly the same manner as in Example No. 1. The pressed time was three minutes with a closing time of about twenty-five seconds which was included in the three-minute press time. The board produced by this example was tested and found to have a nominal thickness of three-quarters of an inch, a density of forty-seven pounds per cubic foot, the species, of course, was pine, the adhesive content was 8.9 percent (O.D. basis), the modulus of rupture was 4,000 p.s.i., the internal bond was 231 p.s.i., and the screw holding test was 344 pounds.

EXAMPLE NO. 5

At this point the stops on the press were changed to nine-sixteenths of an inch. The board was produced in exactly the same manner as in Example No. 1, except that the central layer contained only 2,000 grams of the fiber-adhesive mixture which was prepared in exactly the same manner as Example No. 1. The pressed time was two minutes and the closing time was thirty seconds, included with the press time. The resulting board was tested and it was found to have one-half inch nominal thickness, the density of fifty-five pounds per cubic foot, the species was predominantly hardwood, the adhesive content was 9.0 percent (O.D. basis), the modulus of rupture was 4200 pounds and the internal bond was 282 p.s.i.

EXAMPLE NO. 6

For producing the sixth board, the stops on the press were again changed to five-sixteenths of an inch. The fiber-adhesive layer and the fine-adhesive layers were prepared in exactly the same manner and with exactly the same starting materials as in Example No. 1. However, the initiial layer of fines-adhesive mixture was reduced to 206 grams, the central fiber core consisted of one thousand grams of fiber-adhesive mixture and the upper layer of fines-adhesive mixture was also reduced to two hundred six grams. The resulting sandwich configuration prepared in exactly the same way as Example No. 1, was placed in the press and pressed for sixty seconds with a closing time of about thirty seconds. The resulting board tested out as showing a nominal thickness of one-quarter inch, a density of fifty-eight pounds per cubic foot, the species was hardwoods, adhesive content was 9.0 percent (O.D. basis), the modulus of rupture was 4400 p.s.i. and the internal bond was 350 p.s.i.

SUMMARY

Commenting on the boards produced in the preceding examples, board No. 1 had only thirty-five pounds per cubic foot density and thus was not quite strong enough to be commercially acceptable. However, its edges were better than most particleboard at density levels thirty to forty percent higher. This board would be acceptable for most domestic purposes.

Boards 2, 3 and 4 show the effects of varied densities between three layer boards and a homogeneous board. The low internal bond of the homogeneous board No. 3 is attributed to unequal core consolidation due to absence of special surfaces, although this board is of acceptable quality. Board No. 4 was made by the preferred method and shows superior properties over the homogeneous board at the same density level.

Boards Nos. 5 and 6 show the versatility of this process in density and thickness capabilities.

All of the boards produced in the above examples were produced with full sanding tolerance of 1/32 of an inch over nominal thickness. As indicated heretofore, the preferred process and the preferred product involves a composition board having a fiber core with surface layers containing fines. Although the composition board produced has an overall density of thirty-five to sixty pounds per cubic foot, the surface layers containing the fines are substantially more dense than the fiber core such that the surface layers would generally have a density of about fifty-five to sixty-five pounds per cubic foot, although the fiber core has a uniform density across its thickness between the surface layers. As far as the homogeneous board of Example No. 3 is concerned, the surface layers are somewhat more dense and the central portion of the board has a substantially uniform density but the line of demarkation between the surface layers and the core portion is difficult to ascertain for obvious reasons.

Whereas the "preferred" process and the "preferred" product have been described in terms of the experimental boards that have been produced in accordance with the details of examples 1 through 6, it should be understood that the preferred method and the preferred product are designed to be practiced in a plant using full scale plant equipment and not the laboratory apparatus described in the specific examples. The pressures available with plant equipment suggest that the preferred pressure to be used in the process of the present invention is 800 to 1,000 p.s.i. although, as indicated in the experimental examples the pressures can be somewhat less. The operating temperatures should be in the range of 280° F. to 480° F. although the preferred range would be 380° F. to 480° F.

The ratio of core fibers to surface fines is important and is dependent upon core density, thickness, accuracy of mat formation, and press deflection. In a nominal three-quarter inch, forty-five pound density board, the surface (fines) should comprise about twenty to thirty percent of the total thickness of the board; for a corresponding three-eighths inch board the surface layers would be about sixty percent of the total thickness of the board. As the board thickness decreases, the percentage of fines will increase; in accordance with the present invention the percentage of surface layers should vary between ten and seventy percent depending upon the board thickness.

In the foregoing description it would appear that the fines are produced only by virtue of a separation process following the grinding step. However, in certain circumstances, depending upon the type of raw material and the thickness of the board to be produced, it is possible that a separate grinding and drying operation for producing fines might be desirable in which the requirement for the additional moisture in this step is not required for the fines operation.

The present invention should be particularly appealing to the industry in that it avails itself of materials which, in large part, are discarded or are used for inferior purposes. As will appear from a study of the results produced in examples 1 through 6, the boards produced according to the present invention are of superior quality; it should also be emphasized that the cost of producing the present invention is low because of the wood cost but more importantly the higher production efficiency as practiced by the preferred method an existing plant and substantially lower cost on a new plant. Another advantage is the versatility in density and thickness which would allow small captive plants to produce all their own board requirements with considerable savings in freight and cost.

Another advantage of the present invention is the very high strengths obtained over particleboard by as much as 80% while vastly superior edges are obtained.

The very rapid press cycles attributed to the use of the screens which only impress to the board less than .010″, because of continuous breathing of steam which allows the higher temperatures especially with low density woods such as ponderosa pine. The use of double screen is preferred because it imparts balance to the board as well as allows steam to more easily escape.

The practice of using prepressing pressures of 50–300 p.s.i. is to be avoided because the action of the cold prepress tends to consolidate the mat uniformity when the objective is to densify the faces while maintaining a uniform core density. This is accomplished by the very rapid closing which causes the core to consolidate without the plastification effect of heat whereas that due to the smaller particle size, the higher moisture content, higher adhesive, and the heat from the platens, the faces become denser than the core. If the closing time is delayed much more than 30 seconds the plastification effect of the heat will cause the core density to decrease to the center.

Although described as a wood product, almost any cellulose material such as straw or bagasse can be used.

Whereas the present invention has been described in particular relation to the examples set forth herein, other and further modifications, apart from those shown or suggested herein, may be made within the spirit and scope of this invention.

What is claimed is:

1. A process for the production of a composition board which comprises wetting a quantity of hogged wood materials until the moisture content of said wood materials is raised to approximately thirty percent on an oven dry basis, then grinding said moisturized wood materials under such conditions as to provide a fiber portion wherein approximately ninety-five percent of the fibers have a length of less than one-half inch and wherein the lengths of said fibers are also about ten times the width and thickness thereof, drying the ground moisturized wood material until the moisture content thereof is reduced to about five percent on an oven dry basis, separating the dried ground wood material into two fractions, the first of said fractions being of said fibers and having a bulk density of about four to ten pounds per cubic foot, the second of said fractions being of fine wood particles having a bulk density of about six to twelve pounds per cubic foot and small enough to pass through a twenty mesh screen, mixing a quantity of fibers with an adhesive mixture to provide a fiber-adhesive mixture for the core of said composition board, separately mixing a quantity of the fine wood particles with an adhesive to provide a fines-adhesive mixture for the surface layers of said composition board, forming a three layered mat by placing a layer of fiber-adhesive mixture on a layer of fines-adhesive mixture and superimposing another layer of fines-adhesive mixture and being of substantially the same thickness as the lowermost layer of fines-adhesive mixture, positioning the three-layered mat between two screens, one on top of the mat and the other on the bottom of the mat, compacting the three-layered mat under elevated temperatures and pressures for a period of time not exceeding six minutes with a press closing time of less than forty seconds, and thereafter separating the screens to produce a composition board with a nearly uniform density core between surface layers of substantially higher density.

2. A process for the production of a composition board comprising wetting hogged scrap wood material until the moisture content thereof is maintained at about thirty percent on an oven dry basis, grinding the moisturized wood material to produce fibers ninety-five percent of which have a length of less than one-half inch and wherein said length is also about ten time the width and thickness of said fibers, drying the fibers until the moisture content is reduced to about five percent on an oven dry basis, mixing said fiber with an adhesive to produce a fiber-adhesive mixture, forming a mat from said fiber-adhesive mixture, positioning said mat between two screens, one on top of the mat and the other on the bottom of the mat, compacting said mat at elevated pressures and temperatures for a period of time less than six minutes and with a closing time of less than forty seconds, and thereafter separating the screens to produce a composition board with a nearly uniform density core between surface layers of higher density.

References Cited
UNITED STATES PATENTS

| 2,686,143 | 8/1954 | Fahrni | 161—268 X |
| 2,817,617 | 12/1957 | Rogers | 161—268 X |
| 3,441,959 | 4/1969 | Sears | 161—268 X |
| 3,563,844 | 2/1971 | Brown | 161—270 X |

MARION E. McCAMISH, Primary Examiner

U.S. Cl. X.R.

161—156, 170, 268, 270; 264—112, 113

UNITED STATES PATENT AND TRADEMARK OFFICE
CERTIFICATE OF CORRECTION

PATENT NO. : 3,843,431
DATED : October 22, 1974
INVENTOR(S) : William W. Dostalik It is certified that error appears in the above-identified patent and that said Letters Patent are hereby corrected as shown below:

Column 6, line 12, "hundred" should read --thousand--.

Column 10, line 38, "time" should read --times--.

Signed and Sealed this sixteenth Day of September 1975

[SEAL]

Attest:

RUTH C. MASON
Attesting Officer

C. MARSHALL DANN
Commissioner of Patents and Trademarks